United States Patent Office 3,476,576
Patented Nov. 4, 1969

3,476,576
PROCESS FOR OBTAINING A SIZE REDUCTION OF NON-LAMELLAR MATERIALS
Paul S. Sennett, Macon, Kenneth Lamar Turner, Gordon, and Horton Harold Morris, Macon, Ga., assignors to Freeport Sulphur Company, New York, N.Y., a corporation of Delaware
No Drawing. Filed Jan. 26, 1967, Ser. No. 611,836
The portion of the term of the patent subsequent to Mar. 2, 1982, has been disclaimed
Int. Cl. C09c 1/02; C09d 7/08; C08h 17/04
U.S. Cl. 106—309
9 Claims

ABSTRACT OF THE DISCLOSURE

A process for reducing the particle size of a non-lamellar mineral. An aqueous slurry of the mineral is agitated with particles of a nonabrasive resilient grinding media. The grinding media has a specific gravity less than two and a particle size smaller than one quarter inch but larger than 200 mesh in diameter.

---

The present invention relates to a process for effecting a size reduction of non-lamellar minerals, including aggregates of non-lamellar minerals. Our invention is particularly useful for effecting a size reduction of non-lamellar talc and non-lamellar calcium carbonate, and of reducing the viscosity of a calcium carbonate dispersion.

It is very desirable that pigmented coating mixes being applied to paper have a relatively low viscosity. Paper is normally coated at very high speeds, so the coating mix must be thin enough to flow smoothly onto the sheet and so give a uniform coating. The viscosity of pigmented coating mixes may be lowered by the addition of water but this procedure adds significantly to the cost of the operation since this water must be subsequently removed by thermal evaporation. Some calcium carbonates, although a satisfactory paper coating pigment in other respects, are so viscous when incorporated into a coating formula that they cannot be used.

Non-lamellar minerals are in a distinct category. Thus lamellar minerals are those crystalline materials which show a pronounced cleavage perpendicular to 1 (and only one) crystalline axis. This arises as a result of much weaker bonding forces parallel to this particular crystallographic axis. When subjected to stress these lamellar materials tend to break along the planes where the bonding energy between adjacent planes is weakest. In contrast non-lamellar minerals do not show a pronounced cleavage perpendicular to one crystalline axis. As a result non-lamellar minerals are not cleaved readily.

Non-lamellar calcium carbonate is a mineral having the chemical composition represented by the formula $CaCO_3$. It is a mineral found in nature as calcite (as in limestone, chalk, and marble) and aragonite. It is used extensively as a pigment, pigment extender, and filler. It is also useful in dentifrices and pharmaceuticals.

Non-lamellar talc is a mineral having the chemical composition represented by the formula:

$$3 MgO \cdot 4SiO_2 \cdot H_2O$$

The term "talc," as it is used in this application, is intended to include also a number of silicate minerals having physical properties similar to the true talc mineral. For example, since talc and pyrophyllite have similar physical properties and end uses they are not considered separately for statistical evaluation in the annual "Minerals Yearbook" published by the U.S. Bureau of Mines. 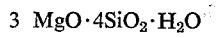

The talc of commerce may be a relatively pure talc mineral or anthophyllite, pyrophyllite, serpentine or tremolite or mixtures of these minerals. In addition, commercial talcs may be contaminated with varying amounts of accessory minerals such as magnesite, dolomite, calcite, diopside, chlorite and quartz.

As mined, talc and calcium carbonate are in the form of rocklike lumps that, for most commercial applications, must be ground to varying degrees of fineness depending on their intended end use. Frequently a purification process such as hand sorting of the crude material or flotation of the ground material must be used. The cost of grinding contributes appreciably to the cost of converting the raw ore into a commercially useful product. The crude ore, after preliminary crushing, is usually dry ground in ball or roller mills and air-floated to give the desired fine particles.

"Ultra-fine" talcs are produced by further grinding in fluid energy mills, the cost of fluid energy grinding adding significantly to the overall processing cost due to the high energy requirements of the grinding method.

Talc and calcium carbonate may exist in several forms including the granular and fibrous forms. A market for such minerals as well as other non-lamellar minerals exists in the field of paper coatings. Thus, it is common practice in the paper industry to coat paper with a mixture of pigment and adhesive in order to provide a smooth surface for printing. High quality reproduction of color photography requires a surface smoother than can normally be obtained from paper pulp alone. Although non-lamellar talc, calcium carbonate and other non-lamellar materials as non-lamellar barium sulfate, titanium dioxide and zinc oxide have been used to some extent as a pigment in paper coatings, it has been found necessary to finely grind these materials prior to their use with an adhesive. This can be burdensome and time consuming.

An object of the present invention is to provide a process for obtaining size reduction of non-lamellar minerals, including aggregates of non-lamellar materials, which minerals are suitable as pigments and extenders in oil and water base systems and in paper coatings.

Yet another object of the present invention is to provide an efficient low cost means for obtaining size reduction of talc.

Still another object of the present invention is to provide a process for lowering the viscosity of a calcium carbonate slurry, and for obtaining a size reduction of calcium carbonate particles.

Other objects and advantages of the invention will be apparent to those skilled in the art from the following description and examples.

In accordance with the present invention, a liquid slurry of a mineral, the particles of the mineral generally being of minus 20 mesh, are subjected to a milling in the absence of any adhesive but in the presence of a fine milling media, to break up aggregates of the mineral and reduce particle size. Removal of the media yields an extender and pigment that is excellent for use in paints and in other products; moreover the pigment brightness is not affected by our process.

The mineral used in our process can be a relatively coarse non-lamellar talc, non-lamellar calcium carbonate and/or certain non-lamellar minerals, i.e., those non-lamellar minerals suitable as pigments or extenders in the paint or paper industries, e.g., barium sulfate, titanium dioxide and zinc oxide. Calcium carbonate and particularly talc are preferred in our process.

The milling media is a fine, non-abrasive, resilient grinding media. The milling action is a combination of viscous shear milling due to agitation of the mixture of liquid, milling media and the mineral; percussive milling due to the multiplicity of impacts of the fine media with itself and the mineral; and fractional milling produced by combination of the rubbing action of the fine media to itself and of the fine media to the mineral. These three simultaneously occurring milling actions bring about particles size reduction of the mineral. It should be understood that our milling procedure not only makes previously unusable minerals suitable for commercial use but also may further improve commercially available products. The degree of milling to be employed in our process will vary depending upon the size and shape of the milling container and also upon the type of agitating device, e.g. the design and pitch of the blades. The agitation also may be carried out by stirring, tumbling, shaking, rocking and the like. In general about a total energy input of 0.05 horsepower-hours per gallon of mixture will bring about the desired result.

The nonabrasive resilient grinding media employed in our invention is preferably made of a plastic such as nylon, polyethylene or a styrene-divinylbenzene copolymer. Similar materials having approximately the same hardness, resiliency, and chemical inertness may also be used. The use of such grinding media avoids objectionable abrasion of the milling apparatus that may occur if nonplastic media such as sand or metal balls are used.

The resilient grinding media may take a number of shapes such as spheres or cylindrical pellets. The media should have a specific gravity less than two. Also the individual particles should be smaller than ¼ inch in diameter but larger than 200 mesh in diameter.

Materials found especially suitable for the milling process include 20 to 40 mesh styrene-divinylbenzene copolymer spherical beads and ⅛ inch diameter by ⅛ inch long cylindrical nylon pellets.

Generally about 30 to 70 volume percent of the aqueous mineral slurry, preferably 40 to 60 volume percent of the aqueous slurry is occupied with the grinding media.

The milling can be carried out in either a batch or continuous manner; the mineral generally being slurried in water. A chemical dispersant or wetting agent or both may be added to the liquid mineral slurry prior to the addition of the resilient grinding media. Liquids other than water may be used to provide a fluid medium for the mineral in the fine media milling process. When the process is carried out on a continuous basis, a portion of the partially ground mineral may be removed from the milling tank, the fine particle size mineral already produced removed from the partially ground mineral by gravity or centrifugal separation techniques. The remaining unground coarse fraction is returned to the milling tank.

The following examples are given to aid in understanding the invention. It is to be understood that the invention is not restricted to the specific compositions or conditions given in the examples. Said examples are rather only illustrative and should not be construed as limiting the invention which is properly delineated in the appended claims.

EXAMPLE 1

A 612 gram portion of the Asbestine 3X fibrous talc (International Talc Co., New York, N.Y.) was slurried in 1,430 grams of water containing 6.12 grams of Igepal CO-630, a non-ionic wetting agent (General Aniline and Film Corporation, New York, N.Y.) and 3.06 grams of tetrasodium pyrophosphate. Then 1836 grams of 18–50 mesh styrene-divinylbenzene copolymer beads were added and the whole mixture stirred vigorously with a propellor-type stirrer for one hour in a polyethylene container. Following this treatment, the styrene-divinylbenzene beads were removed by screening. The talc was recovered from suspension by filtering and drying and found to have the following properties:

| | |
|---|---:|
| 325 mesh screen residue, percent | 0.39 |
| Percent less than 20 microns | 95 |
| Percent less than 10 microns | 84 |
| Percent less than 5 microns | 69½ |
| Percent less than 2 microns | 50½ |

In comparison with the above results, when the original Asbestine 3X was ball milled by conventional methods for five hours, the product had only 33½% of its particles less than 2 microns.

EXAMPLE 2

A 1 lb., 14 oz. sample of Ruby 400 B talc (American Chemet Corporation, 105 W. Madison Street, Chicago, Illinois), was slurried with water at 20% solids, no dispersant being added. Sufficient 18 to 50 mesh styrene-divinylbenzene copolymer beads were added to give a slurry in which the beads occupied 50 percent of the volume. The whole mixture was then agitated vigorously for 1 hour with a cross-arm type impeller. During the agitation period the temperature of the batch increased from 78° F. to 130° F. Following the milling the slurry was screened through a 200 mesh screen to remove the plastic beads. One half of the slurry was then allowed to stand undisturbed for a length of time equivalent to 3 minutes per inch of depth of slurry in the container in order to allow any coarse particles to settle to the bottom of the container. After the sedimentation period, the fine fraction of the talc (that which still remained in suspension) was recovered by careful decantation. Less than 10% of the material settled out during the sedimentation. Both talc products (the sample obtained directly from the milling as well as the sample from the sedimentation step) was recovered by filtration and drying. The products and starting materials had the following particle size distribution:

| | Starting Material (Not treated) | Milled Not fractionated | Milled Fractionated (sample from sedimentation step) |
|---|---:|---:|---:|
| Percent less than 20 microns | 82½ | 100 | 100 |
| Percent less than 10 microns | 63½ | 100 | 100 |
| Percent less than 5 microns | 43 | 97 | 99 |
| Percent less than 2 microns | 26½ | 72½ | 75½ |
| Percent less than 1 micron | 17 | 46½ | 50 |

All three samples of talc were incorporated at 2.15 lbs./gallon into a standard 55% pigment volume concentration polyvinyl acetate latex paint system containing 1.5 lbs. per gallon of rutile titanium dioxide. The table below summarizes the significant properties of the paints containing these talcs.

| | Starting Material (Not treated) | Milled Not fractionated | Milled Fractionated |
|---|---:|---:|---:|
| Reflectance (over black), percent | 81.2 | 87.5 | 88.0 |
| Reflectance (over white), percent | 87.5 | 88.5 | 89.0 |
| Contrast ratio | 92.8 | 98.9 | 98.9 |
| Sheen | 2.5 | 8.5 | 9.0 |
| Viscosity (Krebs units) | 68 | 89 | 89 |

The increase in contrast ratio of both milled samples over that of the starting material is of significant value since higher contrast ratios denote paints of greater substrate hiding ability.

EXAMPLE 3

A paper coating formulation was made up using 16 parts of a casein adhesive to 100 parts of pigment and sufficient water to give a coating composition containing 35% total solids. When coated on paper, the coatings made with the untreated talc and the milled fractionated talc of the previous example had the following properties:

|  | Starting Material | |
|---|---|---|
|  | Starting Material (not treated) | Milled Fractionated |
| Gloss, uncalendered | 2 | 10 |
| Gloss, calendered | 43 | 54 |

As shown in the above table, a significant increase in gloss was obtained with the milled fraction.

EXAMPLE 4

Three commercial fibrous talcs differing mainly in particle size (Asbestine X, Asbestine 3X and Asbestine 425 from the International Talc Co.) were slurried with water at 20% solids, no dispersant being added. Sufficient 18 to 50 mesh styrene-divinylbenzene copolymer beads were added to give a slurry in which the beads occupied 50 percent of the volume. The whole mixture was then agitated vigorously for 1 hour with a cross-arm type impeller. Following the milling the slurry was screened through a 200 mesh screen to remove the plastic beads. The change in particle size distribution is shown in the following table:

|  | Asbestine X | | Asbestine 3X | | Asbestine 425 | |
|---|---|---|---|---|---|---|
|  | Not Milled | Milled | Not Milled | Milled | Not Milled | Milled |
| Percent less than 44 microns | 98½ | 100 | 100 | 100 | 100 | 100 |
| Percent less than 30 microns | 82 | 94 | 99 | 100 | 100 | 100 |
| Percent less than 20 microns | 69 | 86 | 91 | 95 | 100 | 100 |
| Percent less than 10 microns | 49½ | 67 | 64½ | 87 | 94½ | 100 |
| Percent less than 5 microns | 33 | 50 | 43½ | 69½ | 80 | 88 |
| Percent less than 2 microns |  | 36 | 26 | 52 | 56 | 70 |
| Percent less than 1 micron | 10½ | 26 | 22 | 37 | 44 | 55 |

When incorporated at 2.15 lbs./gallon into a standard 55% pigment volume concentration polyvinyl acetate latex paint system containing 1.5 lbs. per gallon of rutile titanium dioxide, the contrast ratio of the paints made with the milled talcs was improved significantly as shown by the following table:

| Asbestine X | 91 |
|---|---|
| Asbestine X, milled | 96.5 |
| Asbestine 3X | 93.5 |
| Asbestine 3X, milled | 98 |
| Asbestine 425 | 96.5 |
| Asbestine 425, milled | 98 |

EXAMPLE 5

A sample of crude Montana talc ore was crushed in a laboratory jaw crusher so that the maximum size of the individual particles was about ¼ inch. The crushed talc was then ball milled dry for 2 hours using ½ inch diameter balls and screened through a 10 mesh sieve. A portion of the minus 10 mesh material was milled for 4 hours in a laboratory milling unit with 18 to 50 mesh styrene-divinylbenzene copolymer beads. The talc-water slurry contained 17.5% by weight talc. The ratio of volume of beads to volume of talc plus water was 1.28 to 1. No dispersants or wetting agents were used. A portion of the talc was allowed to stand undisturbed for a period of time equivalent to 3 minutes per inch of depth of slurry in the container in order to allow any unmilled coarse particles to settle to the bottom of the container. Following the sedimentation period, the finer fraction remaining in suspension was removed by careful decantation. Both of the milled samples were recovered from the water slurry by filtration and drying. The pigments had the following properties:

|  | Ball Milled Only | Milled Not fractionated | Milled Fine Fraction |
|---|---|---|---|
| Percent less than 40 microns | 96½ | 99 | 100 |
| Percent less than 30 microns | 90½ | 97 | 100 |
| Percent less than 20 microns | 80½ | 93½ | 100 |
| Percent less than 10 microns | 65 | 85 | 100 |
| Percent less than 5 microns | 47 | 74 | 98 |
| Percent less than 2 microns | 23 | 60 | 89 |
| Percent less than 1 micron | 15 | 49½ | 77 |

When incorporated at 2.15 lbs./gallon into a standard 55% pigment volume concentration polyvinyl acetate latex paint system containing 1.5 lbs. per gallon of rutile titanium dioxide, the three talcs gave a paint film having the following properties:

| Contrast ratio | 89.7 | 96.8 | 97.2 |
|---|---|---|---|
| Reflectance (white) | 89.5 | 90.0 | 90.5 |
| Sheen | 3.0 | 17.9 | 18.0 |
| Enamel holdout | 58.5 | 47.0 | 46.0 |

EXAMPLE 6

A sample of ground limestone ("Tatewhite" from the Georgia Marble Co., Tate, Georgia) was slurried in water at 40% solids with 0.5% (based on the weight of the ground limestone) tetrasodium pyrophosphate added as a dispersant. Cylindrical nylon pellets, ⅒ inch diameter by ⅒ inch long, were added to give a total of 5 parts by weight of ground limestone. The whole mixture was agitated by shaking on a "Red Devil" paint shaker for 3 hours in a polyethylene container. The ground limestone was recovered from the slurry (after screening out the nylon pellets) by filtration and drying. Both the untreated and treated limestones were incorporated into a paper coating composition containing 16 ½ parts by weight of casein adhesive to 100 parts by weight of limestone. A comparison of the properties of the untreated and treated limestones is shown below:

|  | Untreated | Treated |
|---|---|---|
| Stormer Viscosity, sec.: |  |  |
| 74% |  | 39 |
| 72% |  | 21 |
| 70% |  | 13 |
| 65% | NC | 8 |
| 60% | 13 | 8 |
| 55% | 9 |  |
| Percent less than 2 microns | 39 | 40 |
| Coated paper, uncal. gloss | 3 | 3 |

The Stormer viscosity readings are expressed as the number of seconds required for a spindle to make 100 revolutions under the driving force of a 150 gram weight. "NC" indicates "no check," i.e., the slurry was so viscous that the spindle would not revolve. The percent figures in connection with the Stormer Viscosity show the percent solids at which the Stormer Viscosity was measured. The figures are weight percent solids, e.g., 72 g. of clay and 28 g. of water give 72% solids slurry.

The viscosity reduction in the treated limestone slurry was unexpected in view of the non-lamellar characteristics of the limestone.

EXAMPLE 7

A sample of a commercial precipitated calcium carbonate, Purecal T (Wyandotte Chemical Co.) was slurried in water at 27% solids with 1.0% (based on the weight of calcium carbonate) tetrasodium pyrophosphate added as a dispersant. Cylindrical nylon pellets, 1/10 inch diameter by 1/10 inch long, were added to give a total of 5 parts by weight of calcium carbonate. The whole mixture was agitated for 3 hours by shaking on a "Red Devil" paint shaker in a polyethylene container. The treated carbonate was recovered from the slurry (after screening out the nylon pellets) by filtration and drying. Both the untreated and treated samples were incorporated into a paper coating composition containing 16½ parts by weight of casein adhesive to 100 parts by weight of calcium carbonate. A comparison of the properties of the untreated and treated carbonates is shown below:

|  | Untreated | Treated |
|---|---|---|
| Stormer Viscosity, sec.: |  |  |
| 40% |  | NC |
| 35% | NC | 10 |
| 20% | 109 |  |
| 15% | 9 |  |
| Percent less than 2 microns | 86 | 95 |
| Coated paper, uncal. gloss | 2.5 | 4.0 |

The above data show that the treatment gave a product of significantly lower viscosity and higher gloss when coated on paper.

EXAMPLE 8

A sample of precipitated calcium carbonate was slurried in water at 35% solids and 0.5% (based on the weight of calcium carbonate) tetrasodium pyrophosphate added as a dispersant. Cylindrical nylon pellets, 1/10 inch diameter by 1/10 inch long, were added to give a total of 5 parts by weight nylon to 3 parts by weight of calcium carbonate. The whole mixture was agitated by shaking on the "Red Devil" paint shaker for 3 hours. The treated calcium carbonate was recovered (after screening to remove the nylon) by filtration and drying. Both the untreated and treated calcium carbonate samples were incorporated into a paper coating composition containing 16½ parts by weight of casein adhesive to 100 parts by weight of calcium carbonate. A comparison of the properties of the untreated and treated limestones showed the following:

|  | Untreated | Treated |
|---|---|---|
| Stormer Viscosity, sec.: |  |  |
| 65% |  | 23 |
| 63% | NC | 12 |
| 50% | 11 |  |
| 45% | 7 |  |
| Percent less than 2 microns | 89 | 93 |
| Coated paper, uncal. gloss | 9 | 13 |
| Coated paper, uncal. brightness | 85.9 | 86.3 |

The above data show that our process gave a product of significantly lower viscosity and higher gloss when coated on paper.

EXAMPLE 9

A sample of precipitated calcium carbonate was slurried in water at 35% solids with 0.5% (based on the weight of calcium carbonate) tetrasodium pyrophosphate added as a dispersant. Cylindrical nylon pellets, 1/10 inch diameter by 1/10 inch long, were added to give a total of 5 parts by weight nylon to 3 parts by weight of calcium carbonate. The whole mixture was agitated 5 hours by shaking on a "Red Devil" paint shaker. The treated carbonate was recovered from the slurry (after screening out the nylon pellets) by filtration and drying. Both the untreated and treated samples were incorporated into a paper coating composition containing 16½ parts by weight casein adhesive to 100 parts by weight calcium carbonate. A comparison of the properties of the untreated and treated samples is shown below:

|  | Untreated | Treated |
|---|---|---|
| Stormer Viscosity, sec.: |  |  |
| 72% |  | 39 |
| 70% |  | 17 |
| 65% | NC | 8 |
| 55% | 7 |  |
| Percent less than 2 microns | 48 | 48 |
| Coated paper, uncal. gloss | 3 | 3 |

The above comparison shows that our process gives a marked decrease in viscosity of a calcium carbonate slurry when the slurry is processed according to our invention.

EXAMPLE 10

A 2500 g. crude aragonite calcium carbonate sample which consists of aggregates of fine needle-like particles cemented together (the aggregates can be as large as several millimeters although the aragonite needles of which they are composed are largely 1 micron or less in size) was treated by milling for 45 minutes with 1/10 inch diameter by 1/10 inch long cylindrical nylon pellets. On a volume basis the aragonite occupied 1/6 of the volume of the charge, water occupied 1/3 of the volume and the nylon pellets occupied 1/2 of the volume. Following this treatment, the nylon pellets were removed by screening and the aragonite dispersed by the addition of 0.40% (based on the weight of aragonite) tetrasodium pyrophosphate.

Water was added to dilute the aragonite slurry and the whole sample was allowed to stand undisturbed in order to allow the coarse particles to settle. The fractionation was allowed to proceed for a period of time equivalent to 45 minutes per inch of depth of slurry. The fine fraction still remaining in suspension was recovered by careful decantation. This fine fraction represented 75% of the original crude aragonite and, after appropriate chemical treatment to increase its brightness, was found suitable as a paper coating pigment and as a paint extender pigment. A sample of the same crude aragonite when subjected to ordinary blunging and dispersion techniques gave only a 57% yield to a 40 minute per inch fine fraction.

For brevity, various features have been illustrated and described in connection with a limited number of illustrative embodiments. It is intended that these features be used also in combination with features shown in other embodiments without departing from the spirit of the invention.

The terms and expressions that have been employed in the specification are used as terms of description and not of limitation, and there is no intention, in the use of such terms and expressions of excluding any equivalents of the features shown and described or portions thereof, since it is recognized that various modifications are possible within the scope of the invention claimed.

What is claimed is:

1. Process of preparing an improved pigment and extender for the paper and paint industries comprising agitating, in the absence of any adhesive, an aqueous slurry of a non-lamellar mineral and obtaining a particle size reduction of the mineral, said slurry containing 30–70 volume percent of particles of a nonabrasive resilient grinding media having a specific gravity less than two, said particles being smaller than one quarter inch but larger than 200 mesh in diameter.

2. Process according to claim 1 wherein the media is removed subsequent to the agitation.

3. Process for obtaining a particle size reduction of talc and obtaining an improved pigment and extender for the paper and paint industries comprising agitating, in the absence of any adhesive, an aqueous slurry of the talc, said slurry containing 30–70 volume percent of particles of a nonabrasive resilient grinding media having a specific gravity less than two, said particles being smaller than one quarter inch but larger than 200 mesh in diameter, said agitation causing at least about 33½% of resultant talc particles to be less than 2 microns in particle diameter.

4. Process according to claim 3 wherein the media is removed subsequent to the agitation.

5. Process for obtaining an aqueous slurry of calcium carbonate of low viscosity comprising agitating, in the absence of any adhesive, an aqueous slurry of calcium carbonate and obtaining a particle size reduction of calcium carbonate, said slurry containing 30–70 volume percent of particles of a nonabrasive resilient grinding media having a specific gravity less than two, said particles being smaller than one quarter inch but larger than 200 mesh in diameter, said agitation causing a reduction in the viscosity of the calcium carbonate slurry.

6. Process according to claim 5 wherein the media is removed subsequent to the agitation.

7. Process according to claim 2 wherein the slurry subsequent to the removal of the media is fractionated and the fractions recovered.

8. Process according to claim 4 wherein the slurry subsequent to the removal of the media is fractionated and the fractions recovered.

9. Process according to claim 6 wherein the slurry subsequent to the removal of the media is fractionated and the fractions recovered.

References Cited

UNITED STATES PATENTS 3,171,718  3/1965  Gunn et al. _____ 106—309

JAMES E. POER, Primary Examiner

U.S. Cl. X.R.
106—288, 306

PO-1050
(5/69)

UNITED STATES PATENT OFFICE
CERTIFICATE OF CORRECTION

Patent No. 3,476,576          Dated November 4, 1969

Inventor(s) Paul S. Sennett, et al.

It is certified that error appears in the above-identified patent and that said Letters Patent are hereby corrected as shown below:

Col. 1, lines 9, 10, Cancel "The portion of the term of the patent subsequent to Mar. 2, 1982, has been disclaimed"

SIGNED AND
SEALED
AUG 4 - 1970

(SEAL)
Attest:

Edward M. Fletcher, Jr.
Attesting Officer

WILLIAM E. SCHUYLER, JR.
Commissioner of Patents